Sept. 7, 1954           R. B. BROWN, JR           2,688,301
SCALE WITH TARE, NET, AND GROSS WEIGHT INDICATORS
Filed April 21, 1952           6 Sheets-Sheet 1
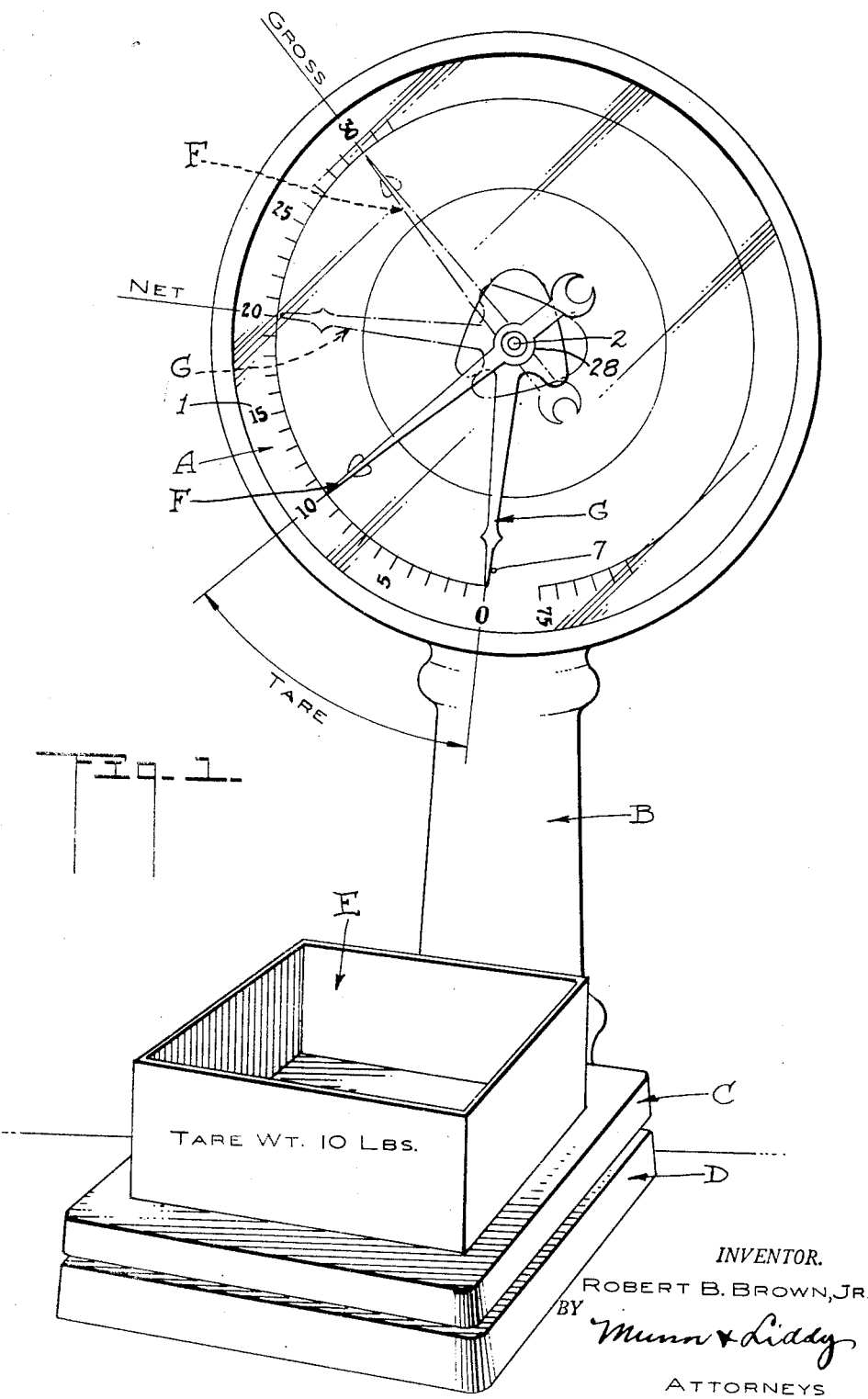
*INVENTOR.*
ROBERT B. BROWN, JR.
BY *Munn & Liddy*
ATTORNEYS

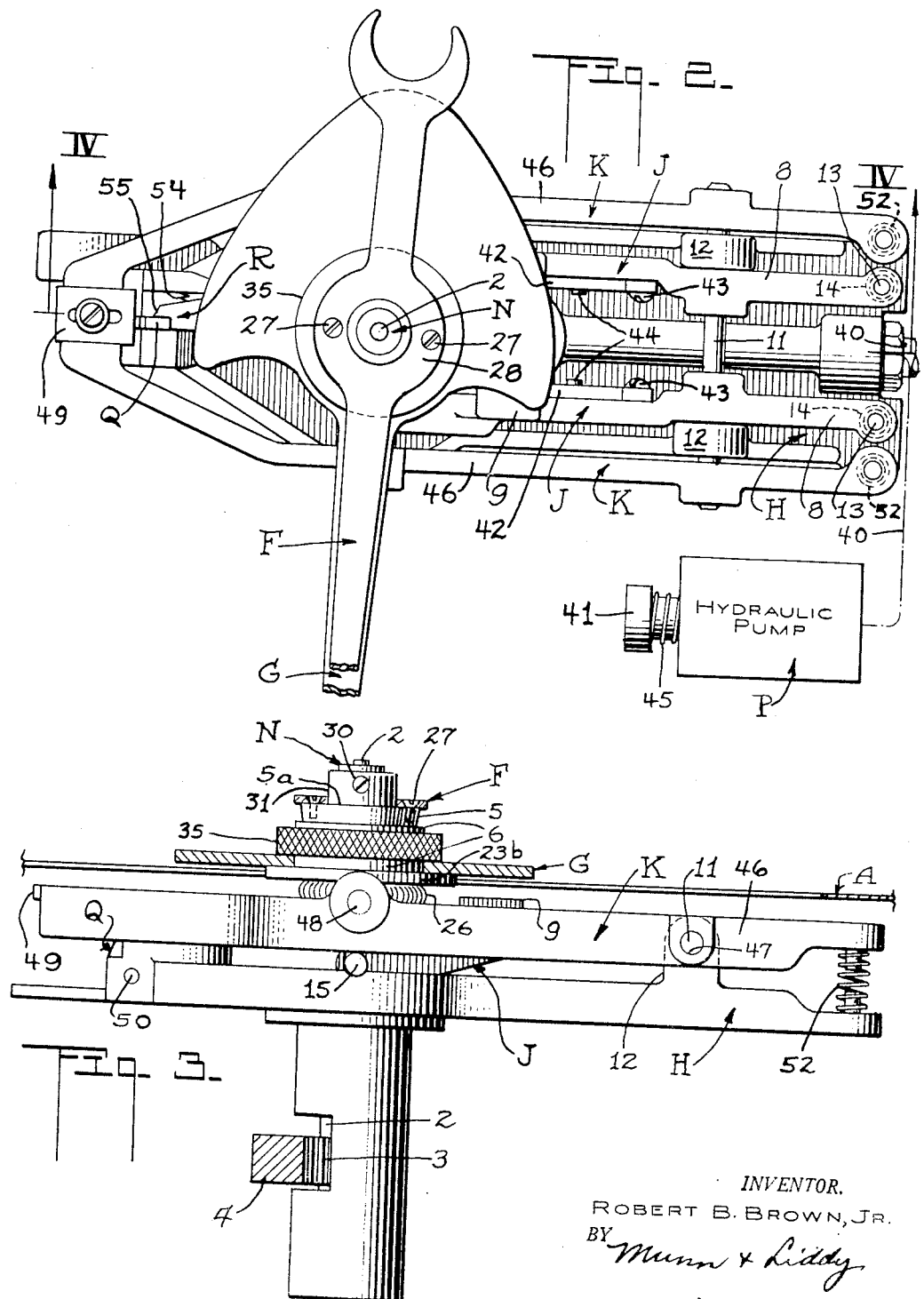

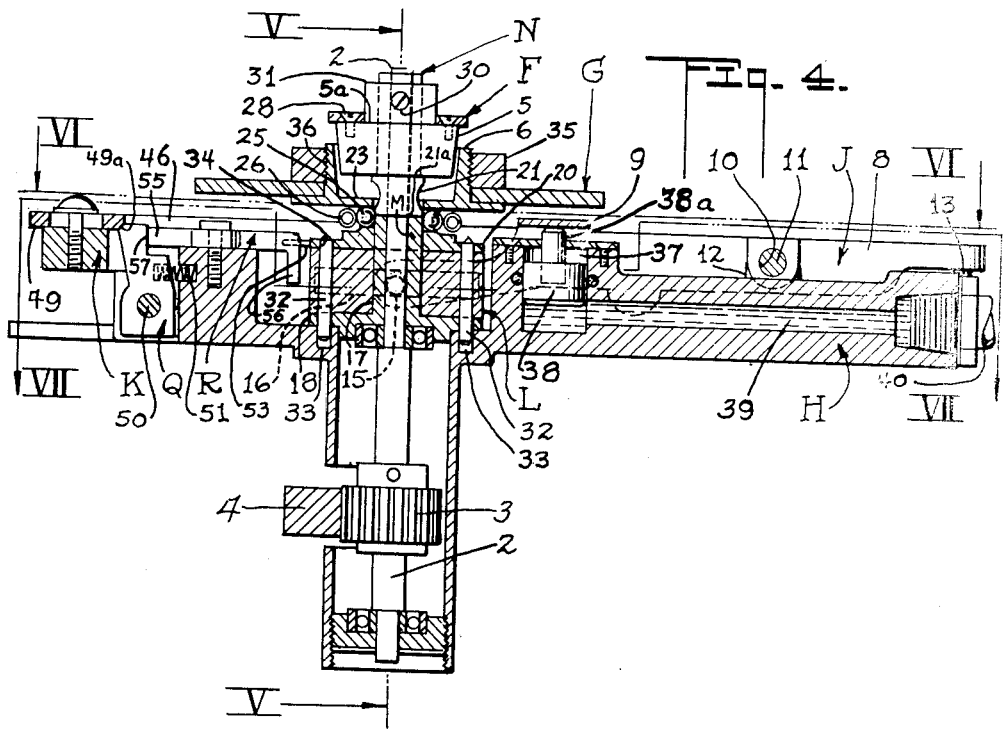
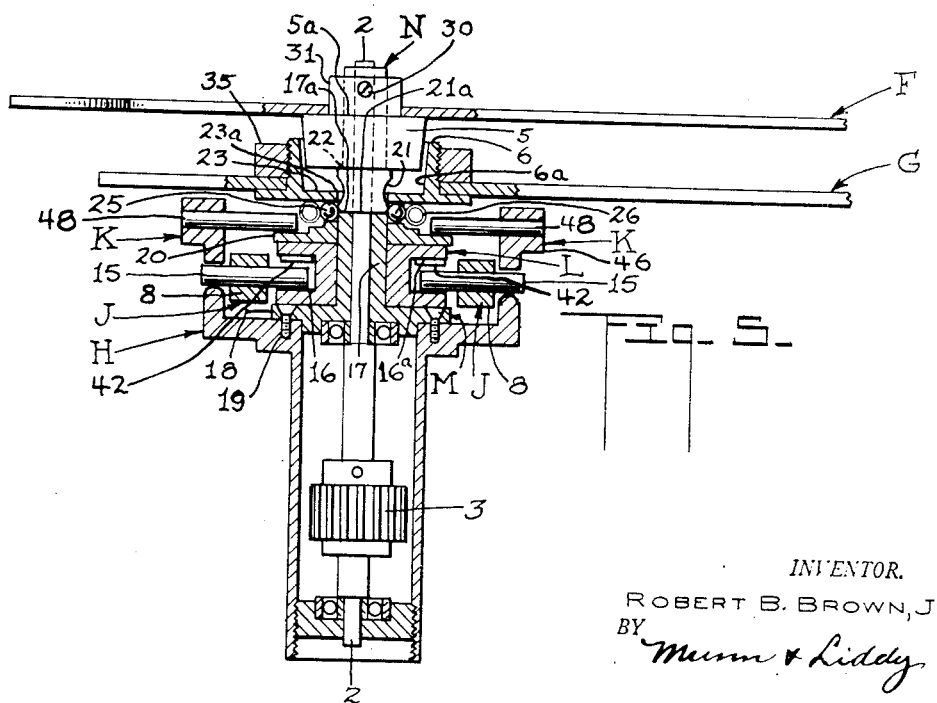

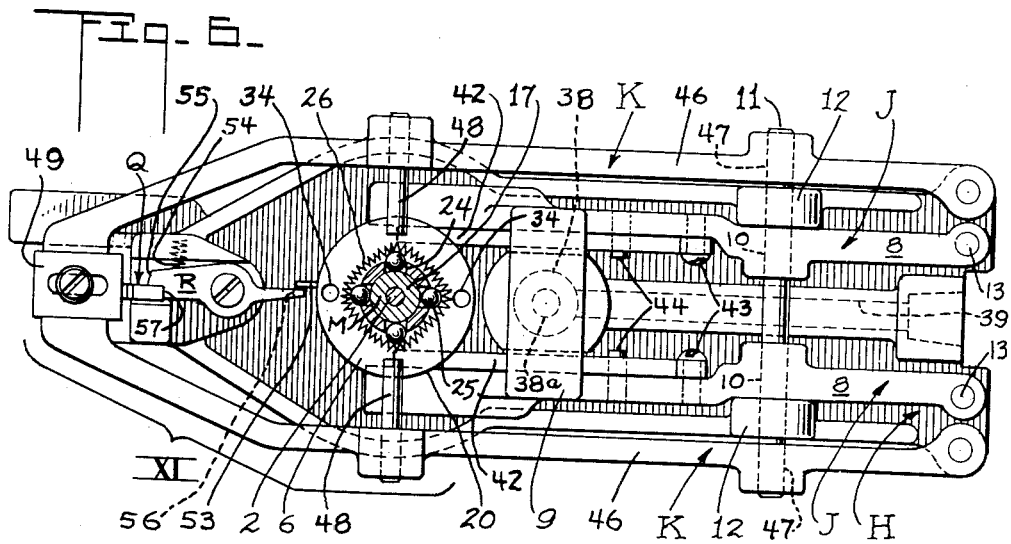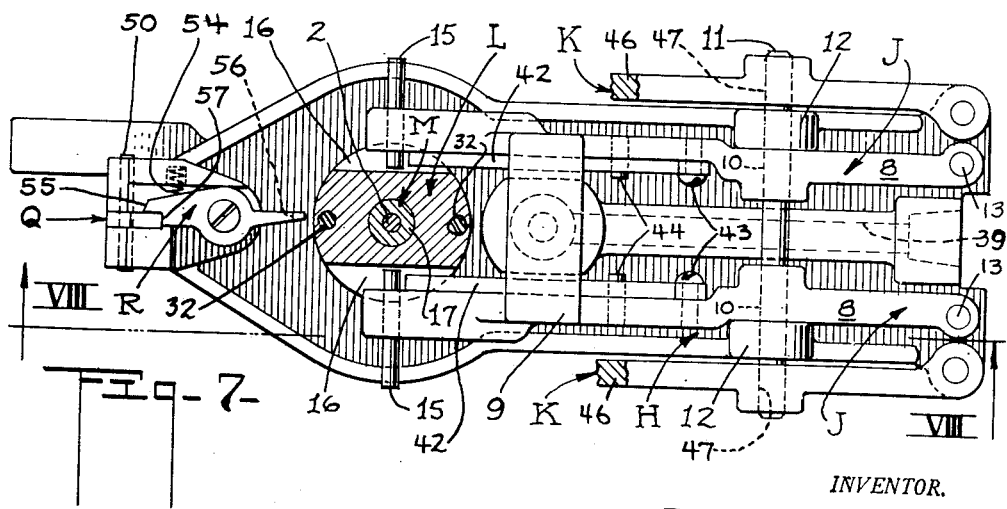

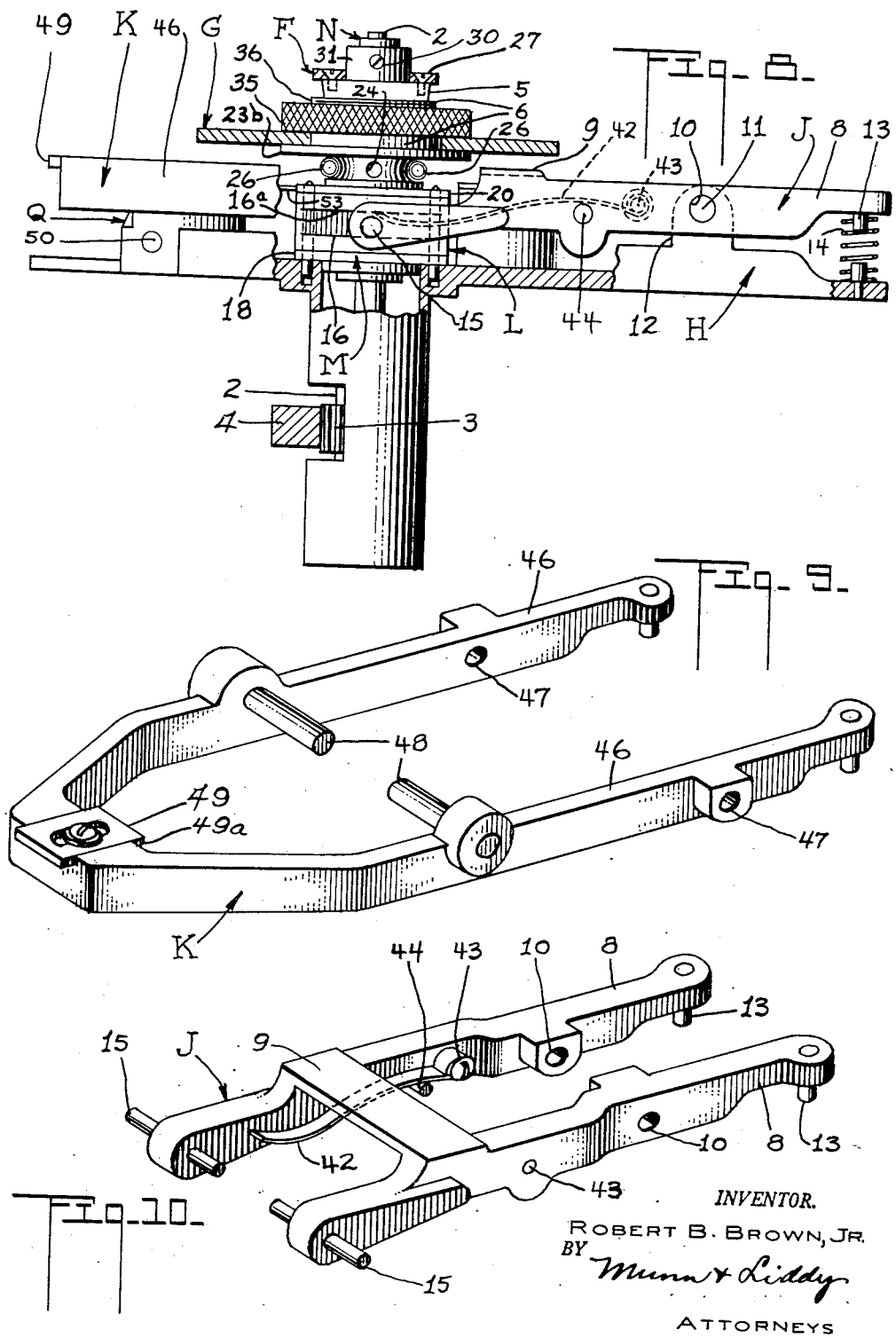

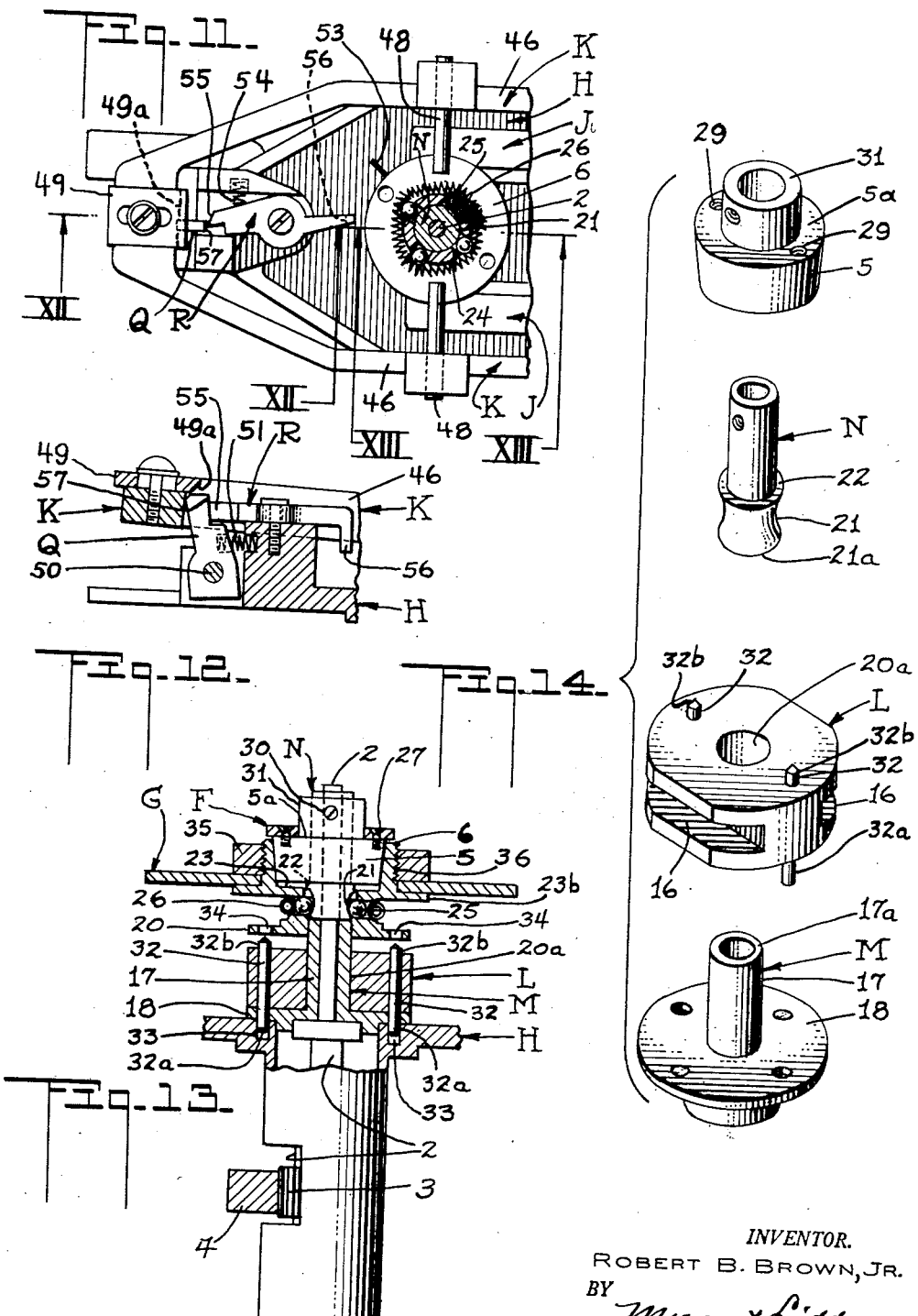

Patented Sept. 7, 1954

2,688,301

UNITED STATES PATENT OFFICE 2,688,301

SCALE WITH TARE, NET, AND GROSS WEIGHT INDICATORS

Robert B. Brown, Jr., San Francisco, Calif.

Application April 21, 1952, Serial No. 283,335

7 Claims. (Cl. 116—129)

An object of my invention is to provide a scale with tare, net and gross weight indicators in which the weight of the tare is indicated on a scale by one pointer after which novel means may be actuated for causing a second pointer to become attached to the first one so as to move in unison therewith. The second pointer will register on the scale the net weight of the material added to the tare. The means for connecting the second pointer to the first, includes non-rotatable means for holding the second pointer from swinging over the scale until it has been positively connected to the first pointer at which time the second pointer is free to swing in unison with the first pointer.

A further object of my invention is to provide a device of the type described in which the second pointer is automatically disconnected from the first pointer when the tare is removed from the scales and the movement of both pointers to zero position causes the second pointer to reach zero position first. The first pointer will continue its movement toward zero reading after being disconnected from the second pointer and will come to rest when reaching the same zero position occupied by the second pointer. Again the disconnecting of the second pointer from the first as soon as the second pointer reaches zero position, actuates means that immediately secures the second pointer to the non-rotatable means and prevents it from moving over the scale until it is subsequently connected to the first pointer.

The device is relatively simple in construction, positive and accurate in operation, and may be added to a standard weighing scale that makes use of a pointer movable over a dial to indicate the weight of an object placed on the weighing platform. The device will not interfere with the normal movement of the hand that is operatively connected to the weighing platform, and swings over the scale to indicate the weight of the object placed on the platform. The device can be added to a standard weighing scale of the type mentioned with but slight alteration being necessary in the scales.

Other objects and advantages will appear in the following specification, and the novel features of the device will be particularly pointed out in the appended claims.

My invention is illustrated in the accompanying drawings forming a part of this application, in which:

Figure 1 is a perspective view of the scales with the device applied thereto;

Figure 2 is a front elevation of the device;

Figure 3 is a view when looking upwardly on Figure 2;

Figure 4 is a horizontal section taken substantially along the line IV—IV of Figure 2;

Figure 5 is a vertical transverse section taken substantially along the line V—V of Figure 4;

Figures 6 and 7 are vertical longitudinal sections taken substantially along the lines VI—VI and VII—VII of Figure 4;

Figure 8 is a horizontal section taken substantially along the line VIII—VIII of Figure 7;

Figures 9 and 10 are isometric views of the two levers employed in the device;

Figure 11 is a view showing the left hand bracketed portion XI of Figure 6 and indicates the clutch in engagement;

Figures 12 and 13 are horizontal sections taken along the lines XII—XII and XIII—XIII in Figure 11; and Figure 14 is an exploded view of different parts shown in isometric, that have a common axis.

In carrying out my invention, I make use of a standard weighing scale having a dial A with a circular row of numbers and markings shown at I in Figure 1, and representing pounds and fractions thereof. The dial A is mounted on a standard B and a weighing platform C is placed at the bottom of the standard and is movably carried by a base D in the usual manner. The base D is integral with the standard B.

In Figure 1, I also show a tare E placed on the weighing platform C and by way of example, I have indicated the weight of the tare E as being ten pounds. It is obvious that the tare may be of various sizes, shapes and weights and I do not wish to be confined to the particular carton shown in Figure 1.

A tare weight indicating hand F is shown in Figure 1 as being movable over the scale I and the hand is positioned adjacent to the number "10" on the scale to show that the weight of the tare is ten pounds. I also show a second hand G which remains in "zero" reading position during the weighing of the tare and then by means presently to be described, the second hand G will be rigidly connected to the first hand F so as to swing therewith and indicate the weight of the material which is placed in the tare. Continuing with the example shown in Figure 1, if twenty pounds of material is added to the tare E, the first hand F will swing to the number "30" on the dial I to indicate the gross weight while the second hand G will swing to the number "20" on the scale and indicate the net weight of the contents.

The means for rigidly connecting the hand G to the hand F after the hand F has moved to indicate the tare weight, also includes novel means for holding the second hand G against accidental swinging away from the "zero" position on the scale until the operator positively connects the hand G to the hand F by a clutch mechanism which will be described hereinafter. Furthermore, after the gross and net weights of the packages and contents on the weighing platform C have been ascertained, the tare E with its contents may be removed from the weighing scale C and this will permit the two hands F and G both to return to "zero" reading. The means that positively connects the hands together for causing the hand G to swing with the hand F and indicate the net weight, will automatically disconnect the hand G from the hand F as soon as the hand G reaches its "zero" or starting position. This will permit the hand F to continue in its return movement until it reaches the "zero" position. The device is now ready for its next operation with both pointers being at "zero" reading.

In Figure 5, I illustrate how the tare weight indicating hand F is connected to the weighing scale platform C, see Figure 1. It will be seen that the hand F is rigidly secured to a shaft 2 and this shaft has a pinion 3 mounted thereon. Figure 4 shows the pinion 3 meshing with a rack 4 and the rack in turn is operatively connected by a means not shown, to the weighing scale platform so as to be actuated by the platform in the usual manner when a weight is placed on the platform. The rack 4 will be moved in direct proportion to the weight and will rotate the pinion 3 and shaft 2 for swinging the hand F and causing the pointer or hand to indicate on the scale 1 the exact weight of the article placed on the platform.

It will also be seen from Figures 4 and 5 that a clutch member 5 is rigidly secured to the shaft 2 and will rotate therewith. In fact, the clutch member 5 will swing in unison with the tare weight indicating hand F at all times. Both Figures 4 and 5 illustrate the clutch member 5 disconnected from a companion clutch member 6 and this is the normal arrangement of the parts when the scale is not in use or when it is desired to use only the hand F to indicate the weight of any article placed on the weighing platform C. The second clutch member 6 is rigidly connected to the net weight indicating hand G and inasmuch as the clutch member 6 is disconnected from the clutch member 5, it will be seen that the hand or pointer G will not be affected when a weight is placed on the platform C such as the tare E. It is for this reason that it is possible to have the hand or pointer F swing and indicate the weight of the tare while the second hand G remains at "zero" position. A stop pin 7 (see Figure 1) is placed on the dial A at a point adjacent to the "zero" reading of the scale 1 and the purpose of the stop pin is to prevent the hands F or G from swinging beyond "zero" position reading as the hands swing in a counter-clockwise rotation during their return movement after a weighing operation is completed.

I will now describe the particular mechanism for connecting the second or net weight indicating hand G to the tare and gross weight indicating hand F after the hand F has been swung to indicate the weight of the tare E that is placed on the weighing platform C. In Figure 3, I show a base member H that is supported in the weighing scale frame shown in Figure 1, at a place which will position the shaft 2 at the center of the dial A. Any means for supporting the base H in the scale frame may be resorted to. It will be noted from Figure 2 that the base H is elongated and is placed in the scale frame so that the plane of the base will be in a vertical position and the length of the base will extend transversely with respect to the scale A.

The base member H pivotally carries two actuating levers J and K shown in isometric views in Figures 10 and 9, respectively. The two levers are pivotally mounted on the platform H and the lever J is disposed within the confines of the lever K. I will describe the structure of the inner lever J first.

It will be seen from Figure 10 that the lever J has two sides 8—8 that extend parallel to one another and are interconnected by a cross-piece 9 so that the entire lever will swing as a unit. The sides 8—8 of the lever J have aligned openings 10—10 for receiving a pivot pin 11 that is clearly shown in Figures 7 and 8. The base member H illustrated in Figure 7 is provided with bearings 12—12 and the pivot pin 11 extends through the bearings. The pivot pin 11 also extends through the openings 10 in the sides 8 of the inner lever J and in this way the lever is pivotally mounted on the base H. Again referring to Figure 10, it will be seen that the right hand ends of the sides 8—8 carry depending studs 13—13, and Figure 8 illustrates how the studs act as positioning means for the upper ends of coil springs 14—14. The springs urge the lever J in a counter-clockwise direction about the pivot pin 11 when looking at Figure 8.

At the opposite ends of the sides 8 of the lever J in Figure 10, I provide clutch moving pins 15—15. The inner ends of these pins are designed to enter grooves 16—16 provided in a clutch moving member L, shown as the third member in Figure 14. In Figure 5, the clutch moving pins 15—15 are clearly set forth and the same figure illustrates the clutch moving member L with its grooves 16—16 into which the pins 15—15 project.

Comparing Figure 5 with the fourth member in Figure 14, it will be seen that a bushing M has a tubular portion 17 in which the shaft 2 is rotatably mounted. The member M has an integral disc-shaped base 18, and this base is secured to the platform or base H by screws 19 or other suitable fastening means, see Figure 5. The clutch moving member L has a bore 20a (see the fourth member in Figure 14) for slidably receiving the tubular portion 17 of the bushing M. A swinging of the inner lever J in a clockwise direction about the pivot pin 11 when looking at Figure 8 will cause the pins 15 to move the clutch moving member L toward the complemental moving member L (see also Figure 5). In fact, the clutch part 6 (see also Figure 5). In fact, the clutch part 6 carries a tail disc 20 that normally bears against the clutch moving member L so that a movement of the member L upwardly in Figure 5 will move the clutch part 6 from the position shown in that figure into clutching engagement with the clutch part 5 as indicated in Figure 13.

I provide novel means for holding the clutch parts 5 and 6 in disengagement or in engagement and I accomplish this by using a bearing N of the shape shown in the second member in Figure 14, and mounting this bearing on the shaft 2 as clearly shown in Figure 5. The bearing N has a ball-receiving groove 21 that is integral therewith and spaced from the sleeve portion of the bearing by a shoulder 22. The conical clutch member 5 rests against the shoulder 22 as shown in Figure 5 and the complemental clutch part 6 has a conical-shaped recess 6a for receiving the conical-shaped clutch part 5. The clutch part 6 has a partition 23 that has an opening 23a therein large enough to slidably receive the ball-receiving groove portion 21. The end 21a of the bearing N contacts with the ends 17a of the bushing M as shown in Figure 5.

Between the partition 23 and the tail disc 20, I provide the clutch part 6 with a plurality of radially extending openings 24 (see Figures 4 and 6). A ball 25 is disposed in each opening and an endless coil spring 26 urges the balls 25 inwardly. When the clutch is in disengagement, the balls 25 will rest on the end of the tubular portion 17 of the bushing M at a point where they will be near the end 21a of the bearing N, but not contacting it. When the clutch is disengaged in this manner, only the pointer F will rotate with the shaft 2 because the pointer is secured to the clutch member 5 shown as the top member in Figure 14, by screws 27 (see Figure 2) that are passed through an enlargement 28 of the pointer and secure the pointer to a shoulder 5a provided on the clutch member. The top member in Figure 14 illustrates the clutch member 5 as having threaded openings 29 extending inwardly from the shoulder 5a. The screws 27 are also illustrated in Figure 4. A set screw 30 (see Figure 5) is placed in the hub portion 31 of the clutch member 5 and secures the clutch member to the bearing N and to the shaft 2. Although the pointer F is caused to swing with the shaft 2 and register the weight of any article placed on the weighing platform C, I provide novel means for holding the pointer G from rotation so long as it remains disconnected from the pointer F.

In Figure 4, I illustrate the clutch moving member L as being provided with guide pins 32 that extend entirely through the member and project beyond both ends thereof (see also the guide pins in the third member of Figure 14). The base member H has recesses 33 for receiving the ends 32a of the guide pins. The other ends 32b project beyond the opposite face of the member L and are pointed so as to enter openings 34 in the tail disc 20 (see Figure 4). It will be seen from this construction that the pins 32 will hold the member L against rotation because the ends 32a are received in the recesses 33. At the same time the pointed ends 32b of the pins will enter the openings 34 in the tail disc 20 (see Figure 6) and will hold the tail disc, and consequently the clutch member 6, from rotation. Figure 5 shows the pointer G adjustably secured to the clutch part 6 by a knurled nut 35 that is threaded down upon a threaded portion 36 of the clutch part 6 and clamp the pointer to a flange 23b which is really an extension of partition 23. This construction permits the pointer G to be adjusted to the desired position and then secured to the clutch part 6.

After the weight of the tare E has been registered on the dial A as indicated by the full lines for the pointer F in Figure 1, the inner lever J is rocked in a clockwise direction by the operator, about the pivot pin 11 when looking at Figure 4 in order to move the clutch part 6 from the disengaged position shown in Figure 4 into the engaged position shown in Figure 13. Any means for swinging the inner lever J may be used and I have shown the base member H provided with a cylinder 37, see Figure 4, for receiving a piston 38. A fluid passageway 39 in the base H communicates with the cylinder 37 at a point below the piston 38 and is connected by a conduit 40 to a hydraulic pump shown at P in Figure 2. A manually actuated plunger 41 is provided for the hydraulic pump P and when this is manually depressed, fluid will be forced through the conduit 40 and the passageway 39 into the cylinder 37 for urging the piston 38 upwardly in Figure 4. The piston carries a reduced portion 38a that bears against the under surface of the cross-piece 9 shown in perspective in Figure 10 and interconnecting the two sides 8—8 of the inner lever J. It will be seen that the depressing of the plunger 41 will move the piston 38 for contacting with the cross-piece 9 and rocking the inner lever J in a clockwise direction about the pivot pin 11. This movement will cause the pins 15—15 to move upwardly in Figure 4 and to force the member L upwardly and to move the clutch part 6 into engagement with the clutch part 5. At the completion of this movement, the tail disc 20 will ride clear of the pointed ends of the pins 32b and therefore the clutch part 6 will be free to rotate with respect to the member L only when the part 6 is in clutching engagement with the part 5. The hand G will rotate only when the pressure on the member L is released and the actuating lever J returns, leaving the disc free of the pins 32.

This movement of the clutch part 6 into engagement with the clutch part 5 will cause the balls 25 to move into the groove 21 as shown in Figure 13 and to hold the clutch parts 5 and 6 in engagement with each other. The coil spring 26 will keep the balls 25 in the groove 21 and therefore the clutch parts will remain in engagement. The pointer G will now move as a unit with the pointer F. Figure 13 illustrates the tail disc 20 spaced from the pointed ends 32b of the guide pins 32 so as to permit the clutch part 6 to rotate.

It is essential that the engagement of the clutch parts 5 and 6 be perfectly true so that the pointer G will not be inclined at an angle with respect to the dial A where an outer end of the pointer will contact with the dial A and mar it when the pointer is swung. I therefore provide leaf springs 42 for the inner lever J (see Figure 10) and I secure a leaf spring to the inner sides of each of the members 8 by screws 43 or other suitable fastening means. The leaf springs extend over inwardly-extending stop pins 44 as shown in Figure 10 and both Figures 5 and 8 indicate how the free ends of the leaf springs 42 contact with the walls 16a of the grooves 16 in the member L. The leaf springs are under tension and they will have a tendency to urge the clutch part 6 into engagement with the clutch part 5 at all times. Figure 5 shows the ends of both the leaf springs 42 contacting with the wall 16a and therefore there will be a uniform movement exerted by the leaf springs against the part L to cause this part to exert a uniform force against the tail disc 20. The result will be that the plane in which the pointer G swings, will always be parallel with the plane in which the pointer F swings and both planes will also be parallel with the surface of the dial A. In a device as accurate and as sensitive as a weighing scale, it is not only necessary to hold the pointer G from rotating until it is connected with the pointer F, but in addition the pointer G must be connected to the pointer F in such a manner that both pointers will swing in planes that are parallel to each other and also parallel to the face of the disc A.

The movement of the piston 38 in Figure 4 to swing the lever J clockwise and cause the clutch part 6 to engage with the clutch part 5 is only momentary and as soon as the plunger 41 is manually released, a spring 45, see Figure 2, will return the plunger to normal position and permit the piston 38 in Figure 4 to return to normal position. The springs 14—14 indicated in Figure 8 cause the return movement of the inner lever J when the fluid in the passage 39 ceases to exert pressure against the piston 38.

When the pointer G is rigidly connected to the pointer F, the material added to the tare E will be weighed. The pointer G will indicate the net weight while the pointer F will indicate the gross weight. The pointer G is accurate in weighing the tare contents because it is held to "zero" reading by the pins 32, until it is rigidly connected to the pointer F by the clutch members 5 and 6, only after the pointer F comes to rest in indicating the weight of the tare E.

I provide novel means for automatically disconnecting the clutch part 6 from the clutch part 5 after the weighing operation is completed and as soon as pointer G reaches "zero" position again, and I make use of the outer lever K for this purpose (see Figure 9). The lever K has sides 46—46 that are provided with aligned openings 47—47 which receive the same pivot pin 11 (see Figure 6). The sides 46 carry inwardly extending pins 48—48 and these pins are shown in Figure 5 as bearing against the the tail disc 20. As the inner lever J is swung in a clockwise direction by the piston 38 in Figure 4 to move the part L and cause the engagement of the clutch part 6 with the part 5, the tail disc 20 of the clutch part 6 will contact with the pins 48 and cause a clockwise movement of the outer lever K about the same pivot pin 11. In this way the outer lever K is moved into a position where it can act upon the clutch member 6 to disengage it from the member 5 when the weighing operation is completed and the tare E with its contents, is removed from the platform C. The lever K will only disengage the clutch parts 5 and 6 when the pointer G reaches "zero" position.

Novel means is shown in Figures 11 and 12 for holding the outer lever K in an operative position after the inner lever J returns to its normal position due to the freeing of the plunger 41 and the return movement of the piston 38. This is necessary so that the clutch parts 5 and 6 will remain in engagement during the weighing of the material added to the tare E. As the inner lever J is returned to its normal position by the action of the springs 14, the part L will slide back along the tubular portion 17 of the member M and will remove the pointed ends 32b of the pins 32 from the openings 34 in the tail disc 20, see Figure 13. At no time during the movement of the member L between its extreme limits of travel, will the ends 32a of the pins 32 leave the recesses 33. The return movement of the member L is not accomplished until the clutch parts 5 and 6 are brought into engagement with each other for locking the pointer G with the pointer F.

The novel means for holding the lever K in an operative position after the inner lever J returns to normal position includes an adjustable stop member 49, see Figures 11 and 12, mounted on the lever. When the lever K is swung in a clockwise direction by the movement of the clutch part 6 into engagement with the part 5, a spring-pressed pawl Q carried by the base member H and pivoted at 50 will be swung to the left in Figure 12 by a spring 51 and will be brought into a position under the stop 49 for holding the outer lever K against return movement. It will be noted from Figure 12 that the stop 49 has a cam edge 49a which is in contact with the pawl Q when the lever K is in operative position. Springs 52, see Figure 3, are strong enough to exert a force against the right hand end of the lever K to swing the lever in a counter-clockwise direction and cause the cam edge 49a of the member 49, see Figure 12, to swing the pawl Q to the right.

I prevent such a counter-clockwise swing of the lever K, and a clockwise swing of the pawl Q into releasing position until the weighing operation has been completed and the pointer G has returned to "zero" position. I pivotally mount a spring-pressed locking lever R on the base member H, see Figures 6 and 7, and when the lever K is swung clockwise about its pivot pin 11, and the spring 51 swings the pawl Q under the cam edge 49a, see Figures 11 and 12, a spring 54 will swing the locking lever R in a counter-clockwise direction when looking at Figure 11, for bringing the end 55 of the locking lever in back of the pawl Q, to prevent the pawl from releasing the member 49 and freeing the lever K.

At the completion of the weighing operation, the hand G will indicate the net weight of the ingredients in the tare E while the hand F will indicate the gross weight on the scale A. The pins 48 will in no way interfere with the normal swinging movement of the pointers as they indicate the gross and net weights. The tare with its contents may now be removed from the weighing platform C and this will cause the rack 4 to rotate the two hands F and G back to "zero" position. The hand G will be the first to return to "zero" reading because it was the last to move away from its starting position. I mount a release pin 53 on the tail disc 20, see Figure 11, and this pin extends in a radial direction. When the hand G is swung, the pin 53 will swing from the position shown in Figure 6 into one shown in Figure 11. As the hand G near its "zero" reading position on its return movement, the release pin 53 shown in Figure 11 and carried by the tail disc 20 will swing counter-clockwise and strike the release finger 56 of the spring-pressed locking lever R, see Figure 6, and will swing it from the position shown in Figure 11 into the one shown in Figure 6.

This will move the end 55 of the locking lever R out of contact with the edge 57 of the spring-pressed pawl Q, thus freeing the pawl. The springs 52 (see Figure 2) that urge the outer lever K in a counter-clockwise direction exert enough force to move the lever K counter-clockwise and move the stop 49 downwardly in Figure 12 to cause the cam edge 49a to swing the pawl Q from the operative position shown in this figure into the inoperative position shown in Figure 4.

The return swing of the lever K from operative to inoperative position, will carry with it the pins 48, and since these pins contact with the tail disc 20 of the clutch part 6 (see Figure 5), such return movement will disengage the clutch part 6 from the clutch part 5. The endless coil spring 26 will yield as the balls 25 are moved from the groove 21 in the bearing N onto the tubular portion 17 of the bushing M.

Since the clutch parts 5 and 6 are automatically disengaged at the moment the hand G returns to "zero" position, the hand will remain in this position while the hand of the pointer F continues in its movement toward the same "zero" position. As soon as both hands return to "zero" reading, the weighing scale is ready for its next weighing operation. Figures 13 and 14 illustrate the fact that the hand G cannot be released from the hand F until the openings 34 in the tail disc 20 are in registration with the pins 32. The clutch part 6 can then be freed from the part 5. The clutch part 6 will be held from rotating by the pins 32 and therefore the hand G will be held in its "zero" position. The hand F will be free to return to normal or "zero" position, and the automatic disconnecting of the hand G from the hand F during the return movement of both hands, will not interfere with the swinging of the hand F back to starting position. It should be kept in mind that so long as the hand G remains disconnected from the hand F, the scale can be used in the usual manner for weighing operations.

One of the novel features of my invention is that the device can be applied to the usual weighing scale and will not interfere with its normal function. It is then possible by the mere momentary depressing of the button 41 in Figure 2, after weighing the tare E, to instantly connect the hand G to the hand F and thus be able to weigh the net contents of the material added to the tare or package. The mechanism for automatically connecting the two hands together includes the inner lever J which moves into inoperative position as soon as it has completed its task of connecting the two hands together. Likewise, the member L moves into inoperative position after sliding along the sleeve 17 and moving the clutch part 6 into engagement with the clutch part 5. The member L with its pins 32 serves the additional function of preventing rotation of the hand G until it has been connected to the hand F. In this way no error in the weighing operation of the net contents in the tare E, can creep in.

The operation of the inner lever J not only connects the two hands F and G together, but it also swings the outer lever K into a position where it will be ready to disengage the hand G from the hand F at the completion of the weighing operation. The outer lever K while held in operative position by the pawl Q, will not interfere with the free swinging of the two hands F and G to indicate the gross and net weights. Furthermore, the lever K will be freed from the pawl Q only when the hand G returns and reaches "zero" position. The moment this occurs, the locking lever R will free the pawl Q, and the latter will permit the outer lever K to return to normal position and disengage the clutch part 6 from the part 5. The movement of these parts is such that the hand F will return to "zero" position without any perceptible interference at the time the hand G is disconnected therefrom when the hand G reaches "zero" position.

I claim:

1. In combination: a weight indicating scale having a "zero" position; a pivoted hand swingable over the scale and about an axis for indicating the weight of a tare placed on the scale; a clutch member rotatable about the same axis and secured to the hand for swinging it; a second clutch member rotatable about the same axis; a second hand secured to the second clutch member and being swingable over the scale when the second clutch member is in engagement with and rotated by the first clutch member for indicating the net weight of the contents placed in the tare; means for normally holding the second clutch member from rotating and for holding the second hand at the "zero" position on the scale so long as the second clutch member is disengaged from the first clutch member; whereby a tare placed on the scale will have its weight indicated by the first-mentioned hand; and means for moving the second clutch member into engagement with the first clutch member and for simultaneously freeing it from said holding means after the first-mentioned hand indicates the tare weight and prior to placing anything in the tare; whereby the second hand will indicate the net weight of the contents of the tare.

2. In combination: a weight indicating scale having a "zero" position; a pivoted hand swingable over the scale and about an axis for indicating the weight of a tare placed on the scale; a clutch member rotatable about the same axis and secured to the hand for swinging it; a second clutch member rotatable about the same axis; a second hand secured to the second clutch member and being swingable over the scale when the second clutch member is in engagement with and rotated by the first clutch member for indicating the net weight of the contents placed in the tare; means for normally holding the second clutch member from rotating and for holding the second hand at the "zero" position on the scale so long as the second clutch member is disengaged from the first clutch member; whereby a tare placed on the scale will have its weight indicated by the first-mentioned hand; and means for moving the second clutch member into engagement with the first clutch member and for simultaneously freeing it from said holding means after the first-mentioned hand indicates the tare weight and prior to placing anything in the tare; whereby the second hand will indicate the net weight of the contents of the tare; and means for automatically disconnecting the second clutch member from the first as soon as the second hand returns to "zero" position on the scale after the tare and its contents are removed from the scale; said last-named means causing the holding means to again engage with the second clutch member and hold the second hand in "zero" position while permitting further movement of the first clutch member and first hand to "zero" position.

3. In combination: a clutch member rotatable about an axis; a weight-indicating hand secured to and swingable by the clutch member; a second clutch member rotatable about the same axis; a second weight-indicating hand secured to and swingable by the second clutch member; a non-rotatable member normally contacting the second clutch member and being slidable along the axis and having stop pins normally holding the second clutch member from rotating; means for moving the non-rotatable member along the axis for moving the second clutch member from engagement with the stop pins into engagement with the first clutch member; and means for holding the second clutch member in engagement with said first clutch member; said first-named means moving the non-rotatable member away from the second clutch member when the latter engages with the first clutch member; whereby the stop pins are freed from the second clutch member and the latter is free to rotate with the first clutch member.

4. In combination: a clutch member rotatable about an axis; a weight-indicating hand secured to and swingable by the clutch member; a second clutch member rotatable about the same axis; a second weight-indicating hand secured to and swingable by the second clutch member; a non-rotatable member normally contacting the second clutch member and being slidable along the axis and having stop pins normally holding the second clutch member from rotating; means for moving the non-rotatable member along the axis for moving the second clutch member from engagement with the stop pins into engagement with the first clutch member; means for holding the second clutch member in engagement with said first clutch member; said first-named means moving the non-rotatable member away from the second clutch member when the latter engages with the first clutch member; whereby the stop pins are freed from the second clutch member and the latter is free to rotate with the first clutch member; said second-named means including means acted upon by the second hand when the latter moves in a predetermined direction and reaches a predetermined point for causing the second-named means to disconnect the second clutch member from the first clutch member and engage the second clutch member with the stop pins for preventing further rotation of the second clutch member.

5. In combination: a supporting base; a shaft rotatably carried by the base; a clutch member mounted on the shaft; a weight-indicating scale having a "zero" position; a weight-indicating hand secured to the clutch member and swingable over the scale for indicating tare weight; a second clutch member rotatable about the shaft axis and having openings for receiving stop pins; a second weight-indicating hand secured to the second clutch member and swingable over the scale for indicating the net weight of contents placed in the tare; a non-rotatable member slidable along the shaft axis and carrying stop pins that are normally received in the openings of the second clutch member for holding the second hand at "zero" position; a spring actuated lever pivotally carried by the base and operatively connected to said non-rotatable member; and means for momentarily swinging said lever in one direction for causing it to move said non-rotatable member and the second clutch member in a direction which will connect the second clutch member to the first clutch member after the first clutch member and first-mentioned hand have been rotated into a certain position by the weight of a tare placed on the scale; the lever returning to its original position due to it being spring actuated and returning the non-rotatable member to its starting position thereby removing the stop pins from the second clutch member and permitting it to rotate with the first clutch member so that both hands will swing together when material is added to the tare; whereby the second hand will indicate the net weight of the added material and the first hand will indicate the gross weight of the tare and material.

6. In combination: a weight indicating scale; a supporting base; a shaft rotatably carried by the base; a clutch member mounted on the shaft; a weight-indicating scale having a "zero" position; a weight-indicating hand secured to the clutch member and swingable over the scale for indicating tare weight; a second clutch member rotatable about the shaft axis and having openings for receiving stop pins; a second weight-indicating hand secured to the second clutch member and swingable over the scale for indicating the net weight of contents placed in the tare; a non-rotatable member slidable along the shaft axis and carrying stop pins that are normally received in the openings of the second clutch member for holding the second hand at "zero" position; a spring actuated lever pivotally carried by the base and operatively connected to said non-rotatable member; and means for momentarily swinging said lever in one direction for causing it to move said non-rotatable member and the second clutch member in a direction which will connect the second clutch member to the first clutch member after the first clutch member and first-mentioned hand have been rotated into a certain position by the weight of a tare placed on the scale; the lever returning to its original position due to it being spring actuated and returning the non-rotatable member to its starting position thereby removing the stop pins from the second clutch member and permitting it to rotate with the first clutch member so that both hands will swing together when material is added to the tare; whereby the second hand will indicate the net weight of the added material and the first hand will indicate the gross weight of the tare and material; a second spring-actuated lever pivotally carried by the base and being operatively connected to the second clutch member; said second-named lever being swung from inoperative position into operative position by the movement of the second clutch member into engagement with the first clutch member; self-locking means for holding the second lever in operative position for permitting the second clutch member to rotate with the first clutch member; a release finger carried by the second clutch member and causing the self-locking means to free the second lever when the second hand returns to "zero" position, whereby the spring-actuated second lever will be moved from operative to inoperative position and will disengage the second clutch member from the first clutch member; the second clutch member only being disengaged when its openings are in alignment with the stop pins; whereby the second clutch member and second hand will be held from rotation while still permitting rotation of the first clutch member and its first hand to "zero" position.

7. In combination: a dial having weighing scale markings thereon; a clutch member rotatable about an axis that extends at right angles to the plane of the dial; a weight-indicating hand secured to the clutch member and being swingable in a plane paralleling the plane of the dial when the clutch member is rotated; a second clutch member rotatable about the same axis as the first clutch member and being movable from declutched position into clutched position with said first-named clutch member; a second weight-indicating hand secured to the second clutch member and being swingable in a plane paralleling the plane of the dial and paralleling the plane defined by the swinging of the first hand; a member normally contacting the second clutch member and slidable along the axis of the second clutch member and when moved in one direction being adapted to move the second clutch member into engagement with the first clutch member; said second clutch moving member having surfaces on both sides of the axis which extend at right angles thereto; a lever for moving the member that normally contacts the second clutch member; leaf springs carried by the lever and yieldingly contacting the surfaces of the member that moves the second clutch member for exerting the same pressure on each surface for moving the second clutch member toward the first clutch member so that the two clutch members when brought into engagement with each other will have their axes in alignment with the first mentioned axis and therefore the planes defined by the swinging of the two hands will remain parallel to each other and to the plane of the dial.

References Cited in the file of this patent

UNITED STATES PATENTS

| Number | Name | Date |
|---|---|---|
| 1,278,646 | Hem | Sept. 10, 1918 |
| 1,318,511 | Thomas | Oct. 14, 1919 |
| 1,348,174 | Hem | Aug. 3, 1920 |